(12) United States Patent
Niv

(10) Patent No.: US 6,940,272 B2
(45) Date of Patent: Sep. 6, 2005

(54) ELECTRIC SOCKET CONTROL DEVICE

(75) Inventor: Nehemia Niv, Petach-Tikva (IL)

(73) Assignee: Green Socket Ltd., Petach-Tikva (IL)

( * ) Notice: Subject to any disclaimer, the term of this patent is extended or adjusted under 35 U.S.C. 154(b) by 0 days.

(21) Appl. No.: 10/268,318

(22) Filed: Oct. 10, 2002

(65) Prior Publication Data

US 2004/0070275 A1 Apr. 15, 2004

(51) Int. Cl.⁷ .............................................. G01R 31/00
(52) U.S. Cl. ..................... 324/158.1; 324/126; 324/127
(58) Field of Search ........................ 324/103 R, 99 D, 324/142, 126–127, 508–510; 340/310.08, 870.17, 310.01, 538, 656, 635; 361/93, 100, 104, 626, 213, 119

(56) References Cited

U.S. PATENT DOCUMENTS

| | | | |
|---|---|---|---|
| 4,100,426 A | * | 7/1978 | Baranowski et al. .......... 307/41 |
| 4,644,320 A | | 2/1987 | Carr et al. |
| 5,097,249 A | * | 3/1992 | Yamamoto ............. 340/310.08 |
| 5,579,201 A | * | 11/1996 | Karageozian ................ 361/119 |
| 5,586,174 A | | 12/1996 | Bogner et al. |
| 5,650,771 A | * | 7/1997 | Lee .............................. 340/656 |
| 5,708,554 A | * | 1/1998 | Liner .......................... 361/104 |
| 5,844,326 A | * | 12/1998 | Proctor et al. ................. 307/34 |
| 6,476,729 B1 | * | 11/2002 | Liu ........................ 340/870.11 |
| 6,538,421 B1 | * | 3/2003 | Carpenter .................... 324/127 |
| 6,617,972 B2 | * | 9/2003 | Takarada et al. ............. 340/635 |

FOREIGN PATENT DOCUMENTS

| | | |
|---|---|---|
| GB | 2386004 | 9/2003 |
| WO | WO 03/048911 | 6/2003 |

* cited by examiner

Primary Examiner—Vinh P. Nguyen
(74) Attorney, Agent, or Firm—Fenster & Company

(57) ABSTRACT

An apparatus that controls the supply of electrical power including one or more monitors adapted to sense a state of current flow supplied to a device, one or more controlled sockets, a power input; and a logic circuit. The logic circuit controls the supply of electrical power to at least one of the controlled sockets responsive to the sensed state of current flow supply to the sensed device.

30 Claims, 6 Drawing Sheets

ELECTRIC SOCKET CONTROL DEVICE

FIELD OF THE INVENTION

The present invention is related to a device that controls electric sockets.

BACKGROUND OF THE INVENTION

Some electric appliances are used in conjunction with other appliances. For example a video needs a television or display. In some cases a user needs to turn on many switches to use an appliance with its auxiliary appliances. Some of the appliances may be positioned with their activation switches in awkward or inaccessible positions.

A common solution to avoid turning on multiple switches in awkward positions, is to use a strip of electric sockets with a central switch. However the strip is frequently placed in an awkward position behind all the appliances. Additionally, some appliances need to be turned on or off in a specific sequence in order to function properly, for example some computers need to be turned off by software and afterwards the auxiliary devices can be turned off. An additional example is a computer that needs to be turned on after turning on some auxiliary devices, which must be working in order for the computer to load correctly.

SUMMARY OF THE INVENTION

An aspect of some embodiments of the invention relate to an integral socket control device that acts as an automatic switch for one or more electric sockets. In some embodiments of the invention, the socket control device activates and/or deactivates the electric sockets responsive to the status of electric current flow in a monitored socket or monitored cable. Optionally, when a threshold current is detected, for example an appliance is turned on, the socket control device activates the controlled electric sockets after an optional delay. Likewise when the current ceases, the socket control device optionally turns off the electric sockets after an optional delay. For example the socket control device can be used to automatically shut down peripheral devices of a computer that is connected to the monitored socket or cable.

In some embodiments of the invention, the socket control comprises a non-invasive cable test unit, which detects current in the monitored cable, for example by detecting a magnetic field generated by the current in the cable. Alternatively or additionally, the socket control device supplies the electric current directly to the appliance being monitored, for example using a socket connection, and detects the power usage of that socket.

In some embodiments of the invention, the socket control device can be used to impose rules on one or more controlled sockets in response to the status of the monitored sockets or monitored cable. For example, the logic rules can define the order of turn on/turnoff, the identity of sockets to turn on or off and/or the length of the time delay for the response of the controlled sockets to the status of the monitored sockets or monitored cable.

In an exemplary embodiment of the invention, the socket control device is used for energy saving, for example for shutting off power to computer peripherals when a computer is turned off and/or shutting down cable set-top boxes when television is turned off. Optionally, the threshold current is set based on the minimal current drain of the monitored device, when it is off. For example, a television often draws some current when the screen is off, as does a computer. This threshold may be programmable or selectable, for example using a switch or by training of the device.

In an exemplary embodiment of the invention, a socket control device is trained to recognize a state of the monitored device. For example, a user may press a button on the socket control device to indicate that the monitored device is now "on", "off" or in any other state at which switching of current for a controlled socket is desired. The settings may be retained, for example in a non-volatile memory.

In an exemplary embodiment of the invention, when power to a controlled circuit is switched on and/or off, the switching is performed in a manner which prevents spikes and/or other causes of damage in a device attached to a monitored socket. For example, the increase in voltage may be gradual, rather than abrupt. Optionally, a plurality of switching profiles are provided, which a user may select, for example, to match to characteristics of particular devices.

An aspect of some embodiments of the invention relates to a circuit element for assembling the socket control device above. The circuit element controls an output based on a load of a different output. The circuit element comprises an input, a sink, and a dependent sink. The dependent sink supplies current based on the current in the sink.

There is thus provided in accordance with an exemplary embodiment of the invention an apparatus that controls electrical power comprising: one or more monitors adapted to sense a state of current flow supplied to a device, one or more controlled sockets, a power input and a logic circuit, which controls electrical power to at least one of the controlled sockets responsive to the sensed state of current flow.

Optionally, the apparatus comprises sockets, wherein the monitors comprise current sensors in the sockets.

In an exemplary embodiment of the invention, the one or more monitors comprise a sensor which senses the state of current flow in electric cables.

Optionally, the apparatus comprises monitors shaped as slots adapted to receive electric cables in which current is to be sensed.

In an exemplary embodiment of the invention, the apparatus comprises a common housing for controlled sockets and monitored slots.

Optionally, the sensor senses common mode currents.

In an exemplary embodiment of the invention, the apparatus comprises a common housing for controlled sockets and monitored sockets.

Optionally, the housing is in the form of a strip of sockets.

In an exemplary embodiment of the invention, the controlled sockets and the monitored sockets are visually different.

In an exemplary embodiment of the invention, the apparatus comprises a surge protector for at least one of the sockets.

Optionally, the apparatus comprises an on/off switch for at least one of the sockets.

In an exemplary embodiment of the invention, the apparatus comprises a central on/off switch for all the sockets.

Optionally, the logic circuit introduces a time delay between the time of sensing the status by the one or more monitors and controlling one or more controlled sockets.

In an exemplary embodiment of the invention, the time delay is a fixed time delay.

Optionally, the one or more sockets comprise a plurality of controlled sockets and wherein the logic circuit provides at least two different controlled sockets with different time delays.

In an exemplary embodiment of the invention, the logic circuit comprises a user input for controlling the logic circuit.

Optionally, the user input includes a dial to select the time delay for at least one of the controlled sockets.

In an exemplary embodiment of the invention, the power input is alternating current.

Optionally, the power input is at a voltage above 24 volts.

In an exemplary embodiment of the invention, the power input is at a standard household voltage of between 10 Volt to 250 Volt.

Optionally, the power input is at a voltage different from the voltage of the monitored electric cables.

In an exemplary embodiment of the invention, the monitor does not substantially drain current from the socket being monitored.

Optionally, the controlling comprises disconnecting the electrical power.

In an exemplary embodiment of the invention, the controlling comprises disconnecting the electrical power after a time delay.

Optionally, the controlling comprises connecting the electrical power.

In an exemplary embodiment of the invention, the controlling comprises connecting the electrical power after a time delay.

An aspect of some embodiments of the invention, relates to a method of controlling the supply of electric current to controlled sockets comprising: placing a non contact electric sensor adjacent to an electric cable, sensing a current flow state of electric current in the electric cable using the sensor, selectively enabling the supply of electric current to one or more controlled sockets responsive to the sensed state.

Optionally, the sensor comprises a slot to hold the electric cable.

In an exemplary embodiment of the invention, the current flow state, is responsive to a current flow greater than or less than a user controllable threshold value.

Optionally, the selectively enabling includes a user controllable delay to the response to the sensed state.

An aspect of some embodiments of the invention, relates to a circuit element that controls the supply of AC electrical current comprising: an AC electric input, an AC electric output, a dependent AC electric output; and a logic unit that controls the supply of electric current to the dependent electric output responsive to a threshold level of current detected on the electric input.

Optionally, the threshold level is user controllable.

In an exemplary embodiment of the invention, the logic unit includes a time delay between the input and the dependent electric output.

BRIEF DESCRIPTION OF THE DRAWINGS

Non limiting embodiments of the invention will be described with reference to the following description of exemplary embodiments, in conjunction with the figures. The figures are generally not shown to scale and any measurements are only meant to be exemplary and not necessarily limiting. Identical structures, elements or parts which appear in more than one figure are preferably labeled with a same or similar number in all the figures in which they appear.

DETAILED DESCRIPTION OF EXEMPLARY EMBODIMENTS

Figure 1:
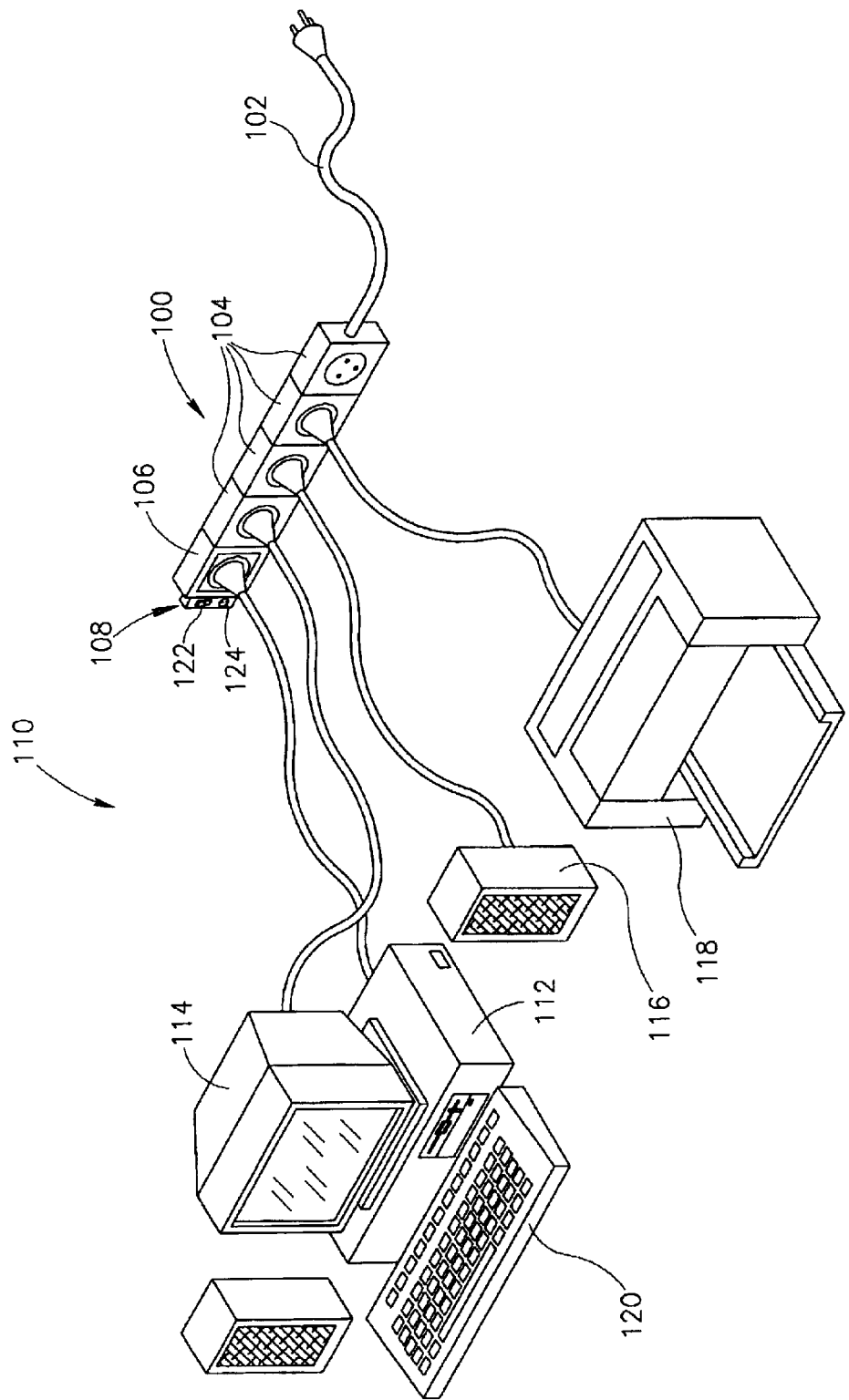
FIG. 1 is an illustration of a socket strip with a monitored socket according to an exemplary embodiment of the invention.

FIG. 1 is a schematic illustration of a socket control device 100 being used by a computer system 110, in accordance with an exemplary embodiment of the invention. Socket control device 100 comprises a strip of controlled electric sockets 104 with a monitored socket 106. Optionally, controlled sockets 104 are activated and deactivated in response to the status of monitored socket 106. For example if the appliance attached to monitored socket 106 is turned on, current is supplied to controlled sockets 104, otherwise they remain disconnected. Alternatively or additionally, if the appliance attached to monitored socket 106 is turned off, controlled sockets 104 also turn off. In some embodiments of the invention more complex relationships are possible, as will be described below.

In some embodiments of the invention, socket control device 100 comprises a control unit 108 with a main switch 122. Main switch 122, disconnects the power supply to socket control device 100 in order to turn off the output from all sockets (104 and 106) of socket control device 100.

Optionally, control unit 108 further comprises a delay dial 124. Delay dial 124 sets a time delay between sensing a change on monitored socket 106 and responding according to the change for controlled sockets 104. For example delay dial 124 may optionally select a value between 0 seconds and 120 seconds. Accordingly, if the appliance monitored on monitored socket 106 is turned off, controlled sockets 104 will be turned off after the selected time delay.

In some embodiments of the invention, all controlled sockets 104 have the same time delay. Alternatively or additionally, different controlled sockets 104 have different time delays. In some embodiments of the invention, the time delay is a fixed value for all sockets, for example 0 seconds or 30 seconds. Alternatively each socket has a different fixed time delay, which is optionally indicated for example by etching on socket control device 100 in order to inform a user. Further alternatively, control unit 108 may include multiple dials to select a time delay for each controlled socket 104 and/or different time delays for turning on and turning off. Optionally, the delay dials are positioned near their corresponding sockets instead of on control unit 108 in order to simplify manufacture. In some embodiments of the invention, other means are used to select a time delay such as switches or buttons or other methods as will be described below regarding FIG. 3.

In some embodiments of the invention, socket control device 100 optionally comprises an integrated power supply cable 102 by which electric current is supplied to the device. Alternatively or additionally, socket control device 100 is provided with a socket to which a standard power cable is plugged into.

In an exemplary embodiment of the invention, computer system 110 is connected to a power source using socket control device 100. In the example illustrated in FIG. 1, computer system 110 includes a base unit 112, a monitor 114, a keyboard 120, speakers 116, and a printer 118. Optionally, base unit 112 is connected to a monitored socket 106, whereas monitor 114, speakers 116 and printer 118 are each connected to a controlled socket 104. In some embodiments of the invention, when a user powers up base unit 112 all the peripheral devices turn on with an optional delay as described above. In an exemplary embodiment of the invention, socket control device 100 is set to turn off controlled sockets 104 after a 30 second delay from sensing that monitored socket 106 is shut down. Accordingly, when a user shuts down base unit 112, the peripheral devices shut down automatically after the delay time. Optionally, the delay is to allow for devices that sense that the base unit has shut down to finish a shut down preparation, such as parking disk heads, print heads and/or go into a sleep mode before being turned off.

In some embodiments of the invention, socket control device 100 is designed for use with appliances using standard alternating current supplied in homes, for example 110–120 Volt or 220–250 Volt. Alternatively or additionally, socket control device 100 may be designed for use with special appliances at different voltage levels for example 24 Volts AC, 50 Volts AC or higher such as used in some laboratories, or voltage levels higher than standard household values such as 3 phase 380 Volts AC such as used in industry. In some embodiments of the invention, the device is manufactured to work with DC current. Optionally, all of the sockets supply the same voltage. Alternatively, some sockets supply one voltage and other sockets supply a different voltage.

In some embodiments of the invention, socket control device 100 comprises further standard features commonly deployed in strip sockets such as surge suppressers for the sockets or a battery backup.

Figure 2A:
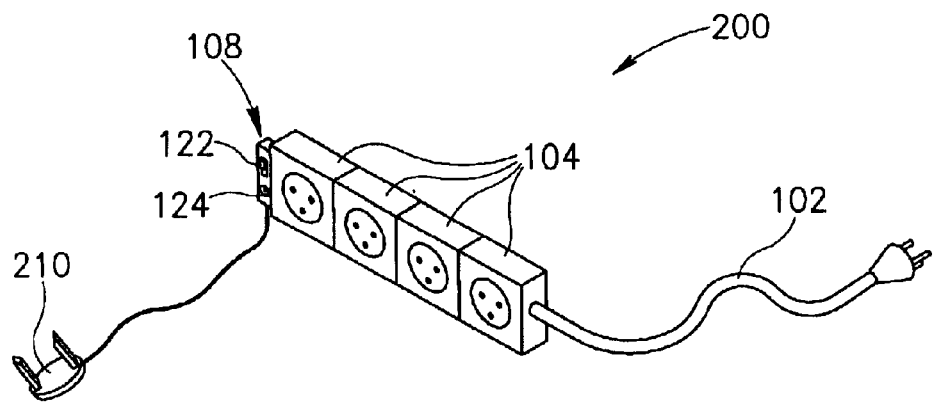
FIGS. 2A and 2B are illustrations of a socket strip with a current probe according to an exemplary embodiment of the invention.
Figure 2B:
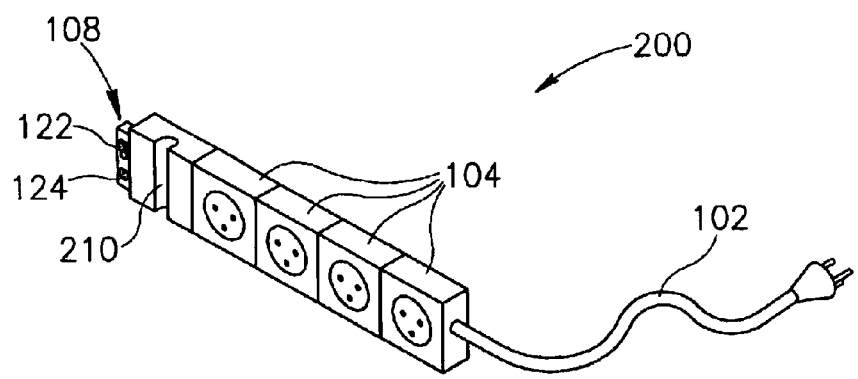

FIGS. 2A and 2B are schematic illustrations of a socket control device 200, which non-invasively senses current in a monitored cable in accordance with an exemplary embodiment of the invention. Socket control device 200 comprises controlled sockets 104 similar to socket control device 100. Additionally, socket control device 200 comprises a power supply cable 102, and, optionally one or more of the following elements: a control unit 108, a main switch 122 and a delay dial 124. However, instead of invasive monitored socket 106, from which an appliance draws current directly, socket control device 200 includes a current probe 210 which non-invasively senses current in a monitored cable. A power cable that supplies current to an appliance is inserted into the opening of current probe 210, and current probe 210 determines the status of the monitored cable.

Optionally, current probe 210 determines the status of the monitored cable by measuring common mode currents. Common mode currents are noise currents between the supply lines and the ground line and appear in almost all electrical appliances, especially in non linear devices and in high frequency currents. Current probe 210 optionally comprises a low resistance resistor or a solenoid wrapped around an open ring. Optionally, the measurement is based on the Hall effect or on a magnetic field measurement. In some embodiments of the invention, only if the current measurements surpass a threshold value do they indicate that the device was turned on. Alternatively or additionally other methods are used, for example measuring other parameters such as differences in temperature.

Current probe 210 signals socket control device 200 to activate/deactivate controlled sockets 104 with an optional delay according to the sensed status of the monitored cable. Accordingly socket control device 200 allows activation/deactivation of appliances which do not take power from the same source as the monitored appliance. This option can be used for example to link between appliances that are fed from a different voltage (for example 110 or 220) or have other differences such as using a three phase power input.

In some embodiment of the invention, current probe 210 is connected with a wire to socket control device 200 as illustrated in FIG. 2A. Thus allowing greater freedom in testing electric cables. Alternatively or additionally, current probe 210 is implemented as a slot in socket control device 200, as illustrated in FIG. 2B, possibly resulting in a more robust device. Optionally, current probe 210, is connected to the tested electric cable in order to monitor it's status by friction, a clasp, adhesive materials and/or other methods.

In some embodiments of the invention, socket control device 100 can include both monitored sockets 106 and current probes 210. This may allow additional flexibility in use of socket control device 100. It should be noted that although monitored sockets 106 supply current directly to a device there is optionally no substantial current drain due to the monitoring of the socket.

Figure 3:
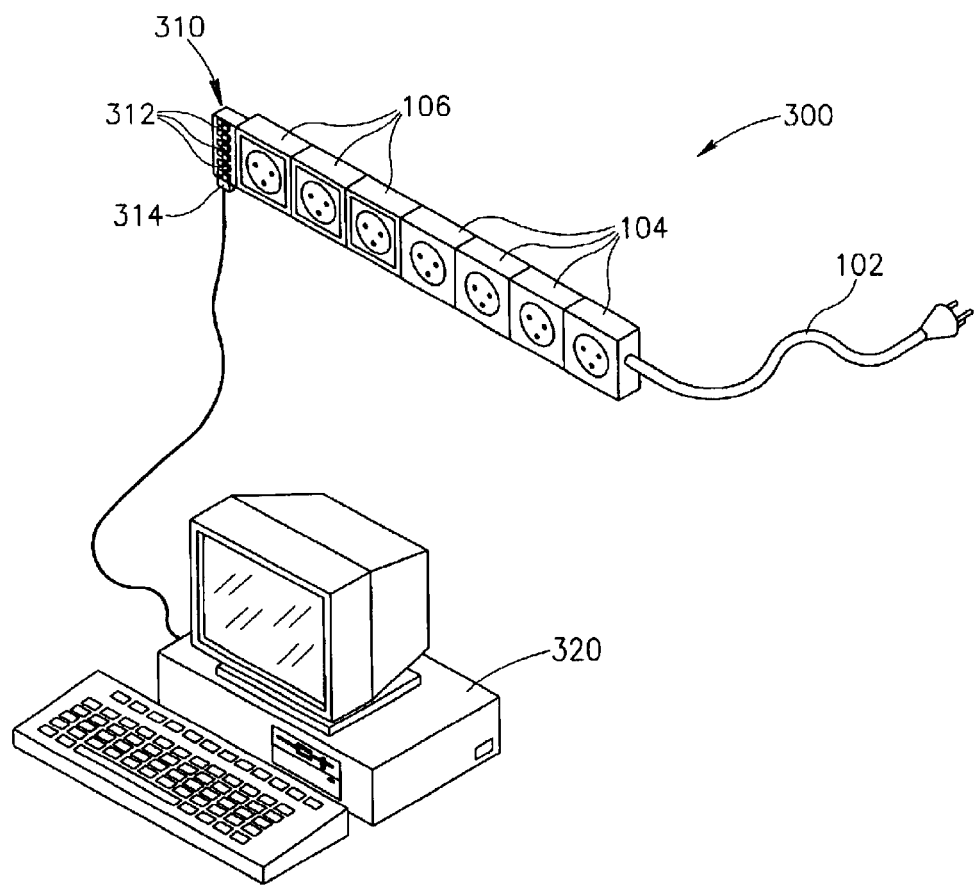
FIG. 3 is an illustration of a alternative socket strip in accordance with an exemplary embodiment of the invention.

FIG. 3 is a schematic illustration of a socket control device 300 to demonstrate the implementation of functional relationships between monitored sockets 106 and controlled sockets 104, in accordance with some exemplary embodiments of the invention. Socket control device 300 comprises one and optionally multiple monitored sockets 106, one and optionally multiple controlled sockets 104. Socket control device 300 optionally includes a logic unit 310 which defines a functional relationship between monitored sockets 106 and controlled sockets 104. For example one controlled socket 104 may be activated if all monitored sockets 106 are on. A second controlled socket 104 may be activated if at least one monitored socket 106 is on. A third controlled socket 104 may be activated if exactly one monitored socket 106 is on and a fourth controlled socket 104 may have a state that is the opposite of that of a corresponding monitored socket 106. Other types of logic include setting a delay time, for example based on the number of activated monitored sockets 106. Additionally, the logic may include setting an order of activation/deactivation of controlled sockets 104, for example based on a user input via a computer as described below.

In some embodiments of the invention, monitored socket 106 optionally, differentiates between multiple threshold values. For example different actions are taken responsive to the amount of current drawn from socket 106.

In an exemplary embodiment of the invention, logic unit 310 comprises a user interface for choosing from multiple predefined logic relationships between monitored sockets 106 and control sockets 104. In some embodiments of the invention, the user interface comprises selection switches 312 and/or other selection means such as dials, slide selectors and/or buttons.

In some embodiments of the invention, monitored sockets 106 are usually different from controlled sockets 104 so that the user can differentiate between them and connect appliances accordingly. For example monitored sockets 106 and controlled sockets 104 differ in color or design of the socket (e.g. embossing). Alternatively or additionally, some or all of the sockets can be selectively programmed by the user to be monitored sockets, controlled sockets or neutral sockets, for example with a switch or programmable methods as described below. Optionally, the position of switches 312 or additional switches such as a switch on each socket (not shown), determine and indicate if the socket is monitored, controlled or neutral. In some embodiments the sockets include a visual indicator, for example a LED (light emitting diode) or neon lamp, which designates if the socket serves as a monitored socket 106 or a controlled socket 104. For example when the LED is on the socket is serving as a monitored socket 106.

In some embodiments of the invention, logic unit 310 is an externally programmable logic unit with a non volatile memory and/or stable switches. Logic unit 310 comprises an input/output port 314 through which a computer 320 or other programming devices can be connected to program logic unit 310. Optionally, computer 320 runs a program that selects which sockets are monitored and which are controlled. The program further optionally selects delay times, order of activation/deactivation and logic relationships between monitored sockets 106 and controlled sockets 104. In some embodiments of the invention, logic unit 310 can be programmed to perform a complex sequence of commands such as activating/deactivating controlled sockets at various absolute times or after a set amount of time responsive to activity of monitored sockets and/or an internal clock.

Figure 4:
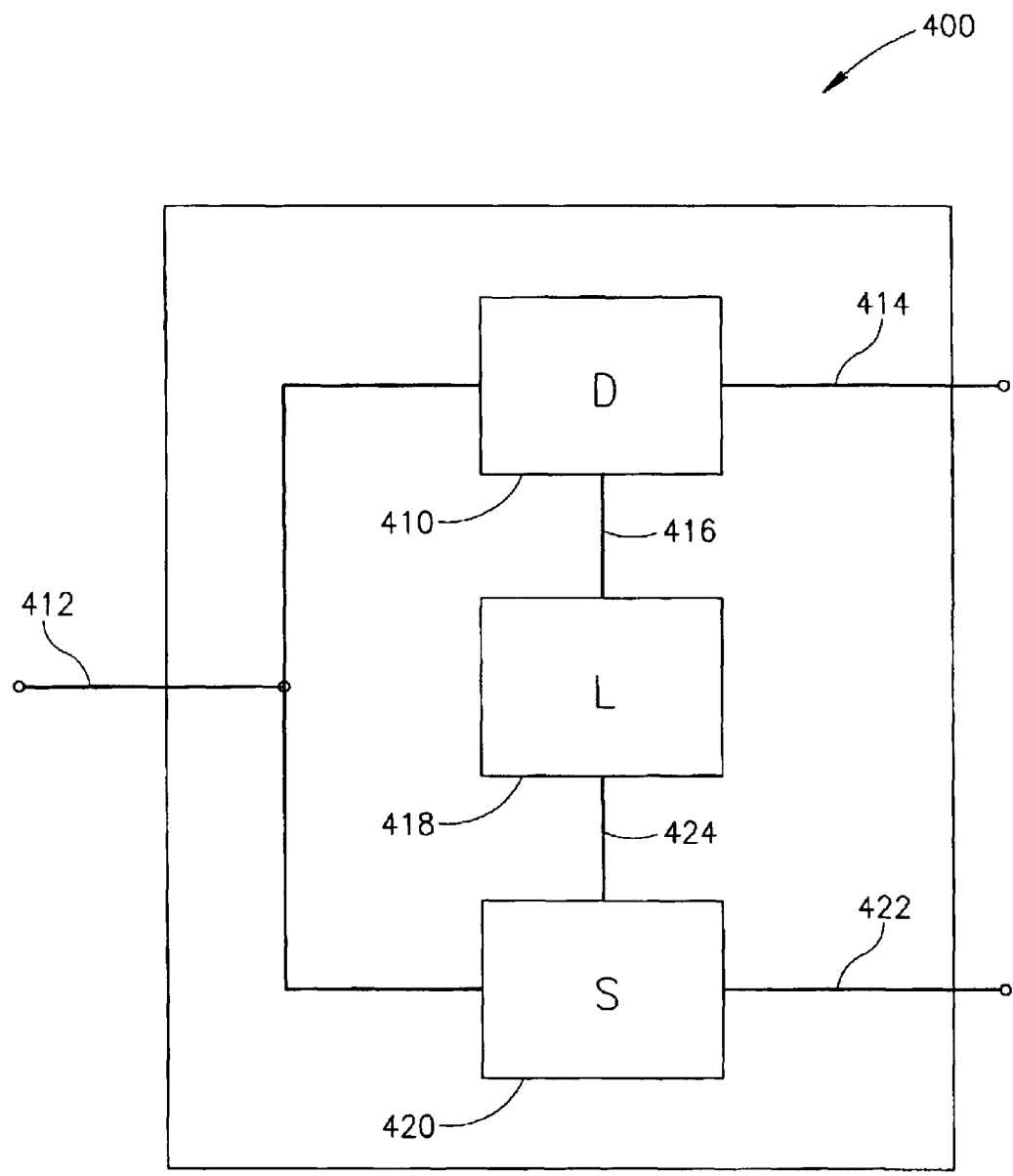
FIG. 4 is an illustration of a circuit element for assembling a socket strip in accordance with an exemplary embodiment of the invention.

FIG. 4 is a schematic illustration of a circuit element 400, which may be used for implementing socket control devices, such as 100, 200 and 300 described above.

In an exemplary embodiments of the invention, circuit element 400 receives a power line input 412 and controls an output 422 based on the load of an output 414. Circuit element 400 comprises a detector 410, which outputs on line 416 a signal which indicates if current is being drawn by output 414. In some embodiments of the invention, detector 410 is preset with a threshold value, wherein current drawn on output 414 will change the status of line 416 only above the threshold value.

In some embodiments of the invention, the signal on line 416 represents binary logic, for example "on" and "off". Alternatively or additionally, the signal on signal line 416 has multiple values (for example three levels) responsive to multiple threshold levels detected by detector 410. Optionally, the threshold current level or levels are user controllable. For example using a varying capacitor as illustrated below in the circuit diagram of FIG. 5B.

In some embodiments of the invention, the signal on signal line 416 is a low voltage DC signal such as 0V for "off" and 5V for "on" (or 12V for "on"). Low voltage DC signals can be supplied directly to standard digital chips in order to implement logic rules. Alternatively or additionally, the signal on signal line 416 can be any type of signal, including a high voltage signal, which is derived from the current being monitored. Such a signal may be useful for other elements which are coupled in the device.

In some embodiments of the invention, the signal on line 416 is supplied directly to an input line 424 of a switch 420. Alternatively or additionally, the signal on line 416 is supplied to a logic circuit 418, which determines whether to pass on the signal to switch 420, cancel it or delay it in order to implement logic rules as described above.

In some embodiments of the invention, logic circuit 418 functions on the power supplied by line 416. Alternatively or additionally, logic circuit 418 is connected directly (not shown) to input 412, similar to detector 410 and switch 420, in addition to the signal on line 416, in order to have enough power for logic circuit 418 to function.

Optionally, switch 420 passes on the input voltage supplied on line 412 responsive to the signal on line 424. If line 424 supplies an "on" signal, switch 420 transfers the input voltage to its output (line 422). Otherwise switch 420 blocks the input voltage from being output on line 422.

In some embodiments of the invention, detector 410 and switch 420 comprise an electromechanical switch or solid state switch such as a semiconductor FET transistor or a Triac, as a mediator between the low voltage signals on lines 416 and 424 to the high voltage current being monitored or controlled. Alternatively or additionally, other types of switches can be used as are known in the art.

In some embodiments of the invention, circuit element 400 comprises multiple detectors 410 and/or multiple switches 420, according to the specific design of the socket strip.

Alternatively or additionally, in some embodiments of the invention, a socket strip such as socket control device 100, is implemented by using multiple circuit elements 400. A monitored socket 106 is implemented by using an output 414 as its power line and a controlled socket 104 is implemented by using an output 422 as its power line. In socket control device 100, line 416 of the single monitored socket, is optionally connected to logic element 418 of the other circuit elements 400 in order to activate/deactivate the controlled sockets. In some embodiments of the invention, each logic element 418 can be set for a different delay value thus enabling different delay times for each controlled socket.

In some embodiments of the invention, logic circuit 418 performs logic rules based on one input line 416 and one output line 424, for example a delay, by waiting a set amount of time that is optionally chosen using dial 124 or by inverting the signal for example outputting an "on" signal when an "off" is received and vice versa. Alternatively or additionally, multiple input signal lines 416 and/or multiple output signal lines 424 from multiple circuit elements are connected to a single logic element 418, in order to implement more complex logic. For example turning on a specific controlled socket only if all the monitored sockets of the device are on.

In some embodiments of the invention, an external signal is supplied to logic circuit 418 instead of the signal supplied by detector 410 in order to allow control of controlled sockets by external signals. For example in implementing socket control device 200, current probe 210, supplies a detection signal for signal line 416 instead of detection circuit 410.

Figure 5A:
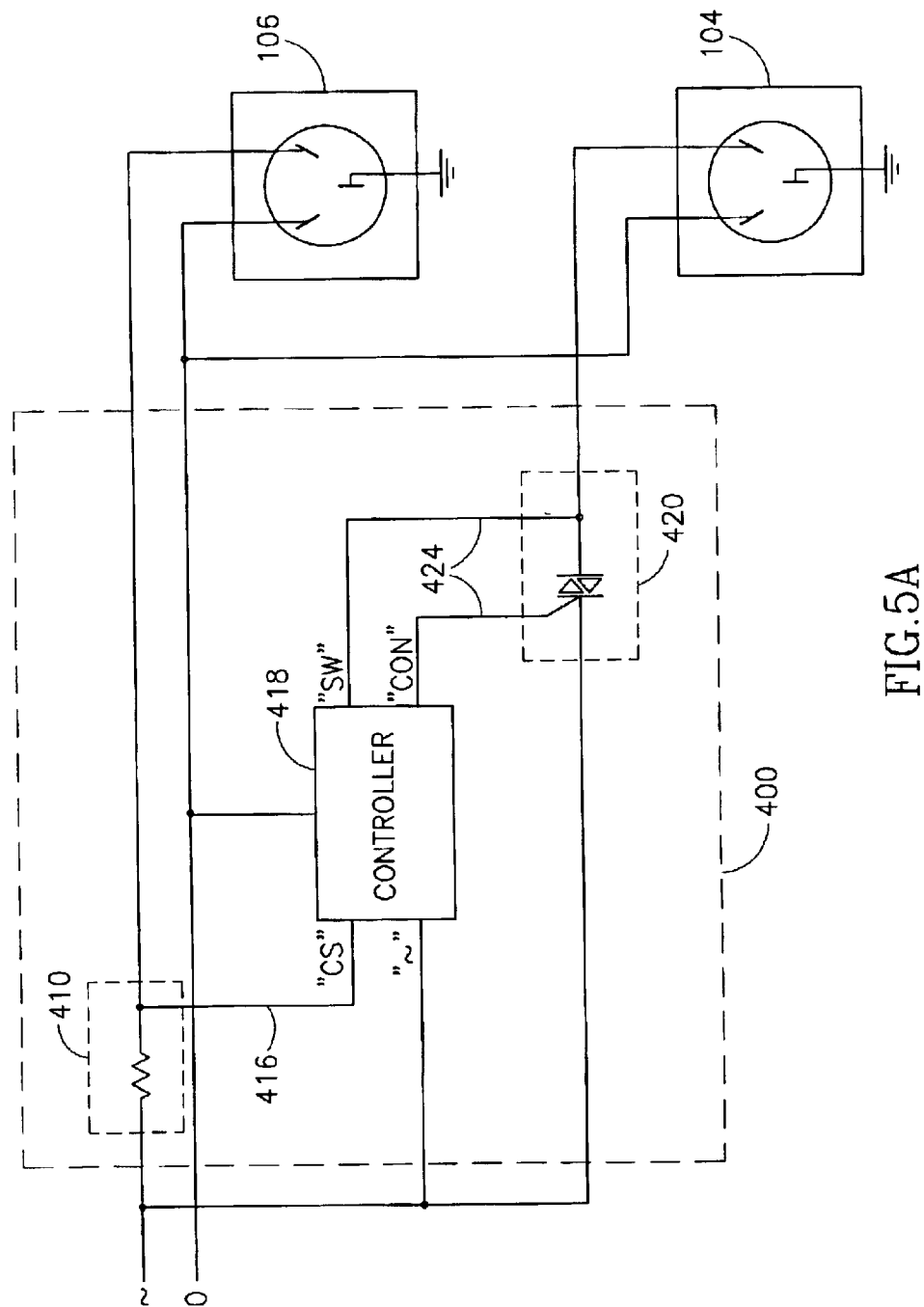
FIGS. 5A and 5B are circuit diagrams of an exemplary implementation of the invention.

FIG. 5A is an illustration of a circuit diagram implementing a socket control device 100 in accordance with an exemplary embodiment of the invention. In an exemplary embodiment of the invention, the circuit in FIG. 5A comprises circuit element 400, which is connected to monitored socket 106 and control socket 104 as described above. Circuit element 400 comprises detector 410, switch 420 with logic circuit 418 connected between them.

Figure 5B:
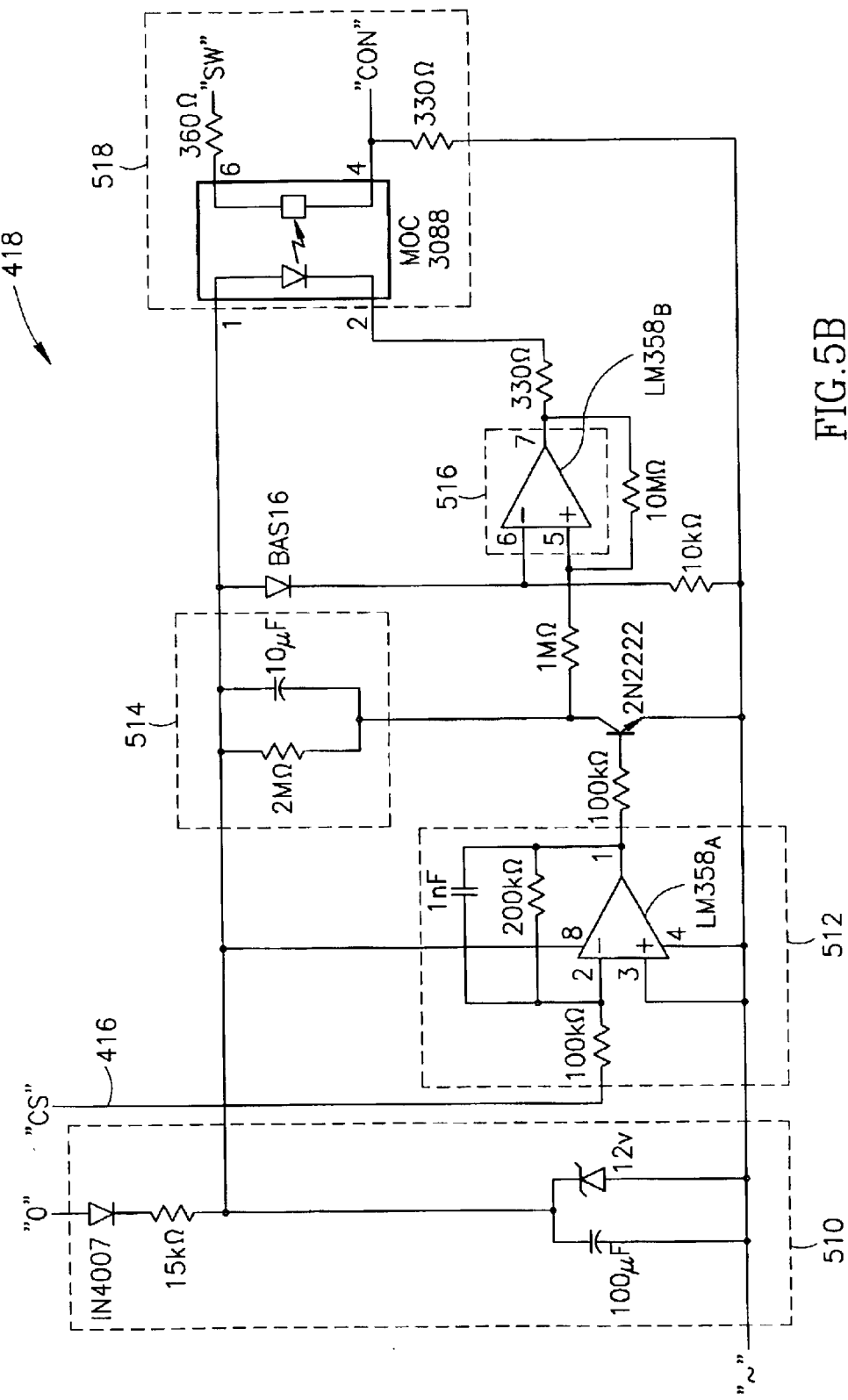

FIG. 5B is an illustration of an exemplary circuit diagram implementing logic circuit 418 shown in FIG. 5A in accordance with an exemplary embodiment of the invention. In FIG. 5B logic circuit 418 is shown to be comprised of the following parts:

1. A power input regulator 510 which sets the working voltage and current for the rest of the circuit;
2. An amplifier and filter unit 512 which receives the input signal on line 416 and prepares it for use in the circuit;
3. A delay unit 514 which introduces a delay to the resulting output signal on line 424;

4. A decision unit 516 which collects the circuit result and transfers it to be translated to executable values; and 5. A switch control 518 which outputs the resulting signal to line 424 to control switch 420.

In FIGS. 1–3 the electrical sockets are shown arranged in a strip, however it should be noted that many other arrangements can be used such as squares, rectangles and circles.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. Apparatus that controls the supply of electrical power comprising:
   one or more monitors adapted to sense a state of current flow supplied to a device;
   one or more controlled sockets;
   a power input; and
   a logic circuit, which controls the supply of electrical power from the power input to at least one of said controlled sockets responsive to said sensed state of current flow supplied to the device.

2. Apparatus according to claim 1, comprising sockets, wherein said monitors comprise current sensors in said sockets.

3. Apparatus according to claim 1, wherein said one or more monitors comprise a sensor which senses the state of current flow in power cables.

4. Apparatus according to claim 3, comprising monitors shaped as slots adapted to receive power cables in which current is to be sensed.

5. Apparatus according to claim 4, comprising a common housing for controlled sockets and monitored slots.

6. Apparatus according to claim 3, wherein said sensor senses common mode currents.

7. Apparatus according to claim 2, comprising a common housing for controlled sockets and monitored sockets.

8. Apparatus according to claim 7, wherein said housing is in the form of a strip of sockets.

9. Apparatus according to claim 7, wherein said controlled sockets and said monitored sockets are visually different.

10. Apparatus according to claim 7, comprising a surge protector for at least one of the sockets.

11. Apparatus according to claim 7, comprising an on/off switch for at least one of the sockets.

12. Apparatus according to claim 7, comprising a central on/off switch for all the sockets.

13. Apparatus according to claim 1, wherein said logic circuit introduces a time delay between the time of sensing the status by said one or more monitors and controlling one or more controlled sockets.

14. Apparatus according to claim 13, wherein the time delay is a fixed time delay.

15. Apparatus according to claim 13, wherein said one or more sockets comprise a plurality of controlled sockets and wherein said logic circuit provides at least two different controlled sockets with different time delays.

16. Apparatus according to claim 13, wherein said logic circuit comprises a user input for controlling said logic circuit.

17. Apparatus according to claim 13, wherein said user input includes a dial to select said time delay for at least one of the controlled sockets.

18. Apparatus according to claim 1, wherein the power input is alternating current.

19. Apparatus according to claim 1, wherein the power input is at a voltage above 24 Volts.

20. Apparatus according to claim 1, wherein to power input is at a standard household voltage of between 110 Volt to 250 Volt.

21. Apparatus according to claim 3, wherein the power input is at a voltage different from a voltage present at the monitored power cables.

22. Apparatus according to claim 2, wherein said monitor does not substantially drain current from the socket being monitored.

23. Apparatus according to claim 1, wherein the logic circuit is adapted to disconnect the electrical power of at least one of the controlled sockets, responsive to the sensed state of the current flow.

24. Apparatus according to claim 2, wherein the logic circuit is adapted to disconnect the electrical power after a time delay.

25. Apparatus according to claim 1, wherein the logic circuit is adapted to connect the electrical power of at least one of the controlled sockets, responsive to the sensed state of the current flow.

26. Apparatus according to claim 2, wherein the logic circuit is adapted to connect the electrical power after a time delay.

27. A method of controlling the supply of electric current to controlled sockets comprising:
   placing a non contact electric sensor adjacent to an electric cable;
   sensing a current flow state of electric current in the electric cable using said sensor; and
   selectively enabling the supply of electric current to one or more controlled sockets responsive to said sensed state.

28. A method according to claim 27, wherein said sensor comprises a slot to hold said electric cable.

29. A method according to claim 27, wherein said current flow state, is responsive to a current flow greater than or less than a user controllable threshold value.

30. A method according to claim 27, wherein said selectively enabling includes a user controllable delay to said response to said sensed state.

* * * * *